Oct. 26, 1948.　　　　F. B. ARNOLD　　　　2,452,174

PACKAGING

Filed Aug. 31, 1946

INVENTOR
FRANK B. ARNOLD
BY
Pennie, Edmonds, Morton + Barrows
ATTORNEYS

Patented Oct. 26, 1948

2,452,174

UNITED STATES PATENT OFFICE 2,452,174

PACKAGING

Frank B. Arnold, New York, N. Y.

Application August 31, 1946, Serial No. 694,195

3 Claims. (Cl. 99—171)

This invention relates to improvements in shipping containers for shipping citrus fruit, etc. by mail. The invention includes the new shipping containers and shipping packages containing the citrus fruit, etc. therein for shipment by mail.

The new shipping containers are made of two separate and independent halves which together form a ball-like hollow shell and with the two halves secured together when used as a shipping container, the two halves being made of strong, flexible, shock-resisting plastic material with a flat portion formed in one or both halves and with a sufficient number of fine holes provided in the plastic material to permit "breathing" of the citrus fruit, etc. enclosed therein.

The new shipping containers are advantageously made of transparent or translucent plastic material so that the contents thereof, e. g. an orange, can be readily seen therein.

The new shipping containers and packages made with them are intended and adapted particularly for shipping, e. g. oranges, through the mail, the transparent container permitting ready inspection of the contents without opening the container.

The material of which the shipping container is made is advantageously a non-inflammable or slow burning plastic, or plastic resin, of a thickness which provides protection for the article therein, but which is flexible and shock-resistant to withstand handling and dropping during shipment and use. It may have a thickness of e. g. 0.03" more or less, depending upon the material used, and may be formed into the individual halves by a molding, drawing or embossing operation. Ethyl cellulose such as the plastic marketed under the trade name Ethocel, or various resinous plastics such as Vinylite plastics can be used. The resulting plastic product should be free from objectionable brittleness and should be resilient, strong, and shock-resistant. It should also be odorless, tasteless and non-toxic to meet the standards and requirements for food containers, and advantageously should have a low vapor-transmission rate. The shipping container may be generally spherical in shape with the two halves of the sphere secured together, advantageously by overlapping. The two halves of the container may vary from a hemispherical shape to a modified oval shape and the two halves are advantageously arranged to telescope to a greater or less extent so that, e. g., oranges of various sizes can be tightly packed in standard size containers by varying the extent of the overlap.

The two halves of the container are advantageously secured together removably so as to permit opening the container and removing the contents. One advantageous method of securing the two halves of the container together in an overlapped position is by means of a transparent adhesive tape, such as the transparent adhesive tapes marketed under the trade names Scotch Tape, Clearseal, etc. With a transparent container and a transparent adhesive tape for securing the halves of the container together, the entire container when used as a package for shipping, e. g., oranges, is transparent and permits viewing of the entire orange in the container.

The two halves of the container can be otherwise secured together, for example, by means of an adhesive or by screwing the two halves together when screw threads are formed at the overlapping portions of the two halves.

The two halves of the container are advantageously made so as to telescope with a tight fit where the halves overlap, and with the edges of the two halves beveled to minimize the likelihood of injuring the contents, e. g., an orange, and of injuring the hands of persons who handle it.

The new container provides for limiting the loss of moisture from the contents and for limiting and regulating the venting or breathing of the contents by having minute holes spaced over the area of the container which permit and regulate the escape of gaseous products therethrough while preventing or minimizing and controlling the entrance or circulation of atmospheric air therethrough.

The new container is intended particularly for shipping citrus fruit such as oranges or grapefruit through the mail, permitting an individual orange, for example, to be packaged in a transparent shipping container and shipped through the mails so that it is readily visible but nevertheless protected against injury, excessive moisture loss and from the air, while permitting controlled breathing of the orange. Thus, gaseous products resulting from the metabolism or catabolism that takes place in fruit after harvesting are permitted to escape and moisture loss is controlled, while at the same time, the fruit is protected. The size, number, and spacing of the minute holes can be varied, and they can be made in the plastic material, e. g., by drilling with fine drills having a size of, e. g. 0.02" or 0.03" more or less, and arranged, e. g., one-half inch apart, more or less, the size and number of the holes being sufficient to permit and regulate the venting of gases and moisture and the breathing of the fruit, etc. while preventing or minimizing and controlling the circulation of atmospheric air therethrough.

The plastic material of which the containers are made may have included therein chemical materials which will retard growth of harmful organisms such as spores, etc., or they may be coated on their inside with a layer of material which will prevent or inhibit growth of harmful molds, fungi, etc.

The material of which the containers are made may be colored by having dyes or coloring material therein. So, also, the plastic materials themselves may be of a nature which limits the transmission of light rays therethrough, or may contain materials which screen out harmful light rays to prevent or reduce change on exposure to sunlight of the packaged fruit, etc. The material may permit passage of rays which will enable the contents to be sterilized by irradiation.

The provision of a transparent container, e. g. for oranges, permits the label containing the address to be inserted between the orange and the transparent container. So, also, labels can be secured to the outside of the container, advantageously labels of transparent materials such as transparent tape. When labels are secured to the outside, an adhesive should be used for the labels which will insure that the labels stick to the particular plastic material of which the containers are made.

Certain of the advantages of the invention can be obtained even with plastic materials which are opaque; but the use of transparent plastics is particularly advantageous, especially for shipping containers, permitting the contents of the package to be readily seen and thus inspected when shipped, e. g. through the mail.

In packages containing, e. g. oranges, the making of the two halves of the container of telescoping construction is particularly advantageous, permitting the packaging of oranges of variable sizes in the same container. Thus, oranges are commonly classified into various sizes and the oranges of each size vary somewhat from each other. By making the container of halves of approximately 3½" diameter which will telescope together, it is possible to use such a container for oranges, e. g., varying from 3" to 3½" in diameter and still obtain a sufficiently tight fit to prevent movement of the orange in the container.

In using the container for the packaging e. g. of oranges, the orange is placed in one-half of the container with the top or bottom in position near the flat portion of the container wall, and the other half is then telescoped over the first half until the orange is tightly held between the two halves. The two halves are then secured together, advantageously by applying a transparent adhesive tape over the joined portions of the two halves. Other means of securing the two halves together can be used, including fasteners extending through the overlapping portions, or other securing means.

With some plastic materials the overlapping portions may be sealed together dielectrically, or they may be cemented together, e. g. by applying a solvent which softens the plastic to cause the overlapping portions to stick together, or by applying adhesive material which adhesively secures together the overlapping portions.

The flat portions of the two halves provide a flat top and bottom for the top and bottom of the orange and also provide a base on which the package or container may stand which prevents wobbling or rolling of the package or container.

An advantageous method of addressing the shipping packages where the plastic material of the container does not permit of writing or stamping thereon is to use a label for the address and for receiving the postal stamp. While opaque paper labels can be used with an adhesive which will stick to the plastic material, it is advantageous to use a transparent label, e. g., of a material such as Cellophane with an adhesive on one side which will stick to the plastic material and which can be addressed on the other side or receive the postal stamp thereon. Where a transparent tape is used around the middle of the package to hold the overlapping halves together, this tape may be of a width which permits the placing of the address thereon and the receiving of the postal stamp thereon.

When the container has been used for shipping, e. g. an orange, and has reached its destination, it can be taken apart by separating the two halves. Where an adhesive tape is used for securing the two halves together, this tape may have one end folded over upon itself to form a tab or handle for taking hold of to strip the tape off the container. When such an adhesive tape is removed the two telescoping halves of the container can be pulled apart to make the contents available. Where the two halves are dielectrically sealed together, or are cemented together with a solvent or adhesive, they can be cut or pried apart with a sharp edged instrument.

The new shipping containers are intended particularly for use in packaging and shipping fruits, etc. of generally round or oval shape such that the container will be made of two halves which are generally hemispherical or oval or elliptical and of a shape to conform with the fruit to be packaged therein and to hold it tight therein.

The new shipping container permits, e. g., oranges to be shipped considerable distances by mail and protects and preserves the oranges while being so shipped. The strong, tough, resilient container protects the oranges against injury and holds the oranges so that they do not move to any appreciable extent therein. Even where the oranges are packaged several days before shipment or may require several days in shipment, they are protected and preserved during such packaging and shipment. The container protects the oranges from injury, while the minute holes provide for controlled breathing of the orange and for controlling the moisture loss from the orange. Incorporation of a preservative material such as diphenyl in the plastic, or coating of the plastic material therewith, will further protect the orange from the growth of harmful molds, fungi, etc. The oranges may be washed with a preservative material such as a borax solution to free them from mold and other contamination and may be packaged immediately after such treatment. The oranges can then be shipped and delivered in an attractive package so that they are readily visible but so that they can nevertheless withstand handling in the mail, and when delivered will be in the form of an attractive package.

The invention will be further described in connection with the accompanying drawings illustrating certain embodiments thereof, but it will be understood that the invention is not limited thereto.

In the accompanying drawings—

The shipping container illustrated is for shipping oranges and is an example of the use of the container for a shipping package.

Figure 2:
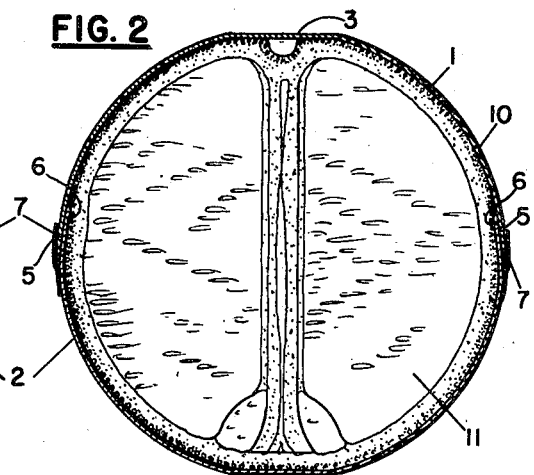
Fig. 2 is a vertical section through the package of Fig. 1.

The shipping container shown is made up of two generally hemispherical halves 1 and 2 adapted to telescope together as shown in Fig. 2 and having flat portions 3 and 4 formed therein. When telescoped together, the edges 5 of the upper half, which are of a somewhat larger diameter, overlap the edges 6 of the lower half, which are of a somewhat smaller diameter, the halves overlapping with a wedge fit and being capable of being overlapped to a greater or less extent. A transparent adhesive tape 7 is shown as affixed to and extending around the package to secure the two halves together.

Figure 3:
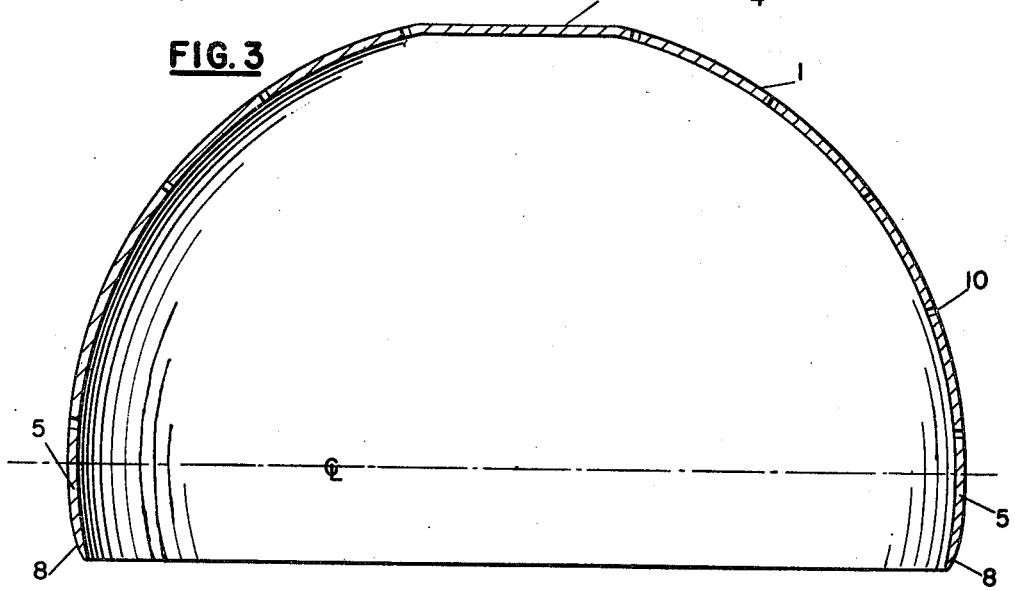
Fig. 3 is an enlarged view showing one form of one of the halves of the container in central section.
Figure 4:
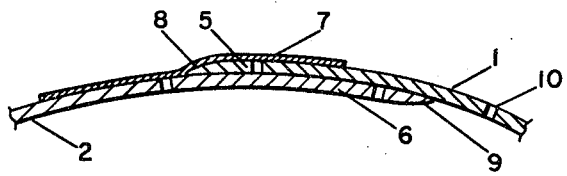
Fig. 4 is an enlarged view of a section through overlapped edges of the container with an adhesive tape applied thereto.

The halves are advantageously made, as shown in Figs. 3 and 4, with beveled edges 8 and 9 so that there is no sharp edge that can scrape or cut the fruit contained inside and so that there is no sharp edge at the end of the outer overlapping half. In molding or shaping the two halves one half will be made somewhat larger than the other where they come together and overlap, and the two halves are advantageously shaped so that they form a tight wedge fit regardless of the extent to which they are caused to overlap.

The halves are provided with a number of minute holes or openings 10 distributed, e. g. about ½" apart, over the area of the two halves.

The container is shown as containing an orange 11 which fits tightly therein.

Figure 1:
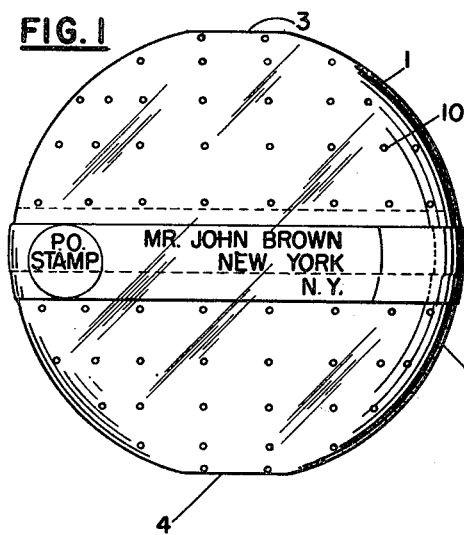
Fig. 1 is an outside view of a package made with the shipping container.

The tape 7 shown for securing the overlapping edges together has the address and the Post Office stamp thereon, as shown in Fig. 1, this tape being a transparent adhesive tape which permits writing and printing thereon, so that it will readily receive the address and Post Office stamp.

The shipping container shown is made of transparent plastic material which, although relatively light, is strong, flexible, and shock-resistant, and capable of withstanding ordinary handling and shipment in the mails. When an orange is placed in one half of the container and the other half is then caused to overlap the first half, they can be pressed together until they come in contact with the orange so that the orange is kept from movement therein. The two halves can then be secured together, e. g. by the use of the transparent adhesive tape as shown.

The plastic material may be, e. g., a cellulose ether plastic such as Ethocel and the transparent adhesive paper will have an adhesive which will adhere thereto.

In the drawings the parts are shown in a conventional manner and much thicker than would represent the actual scale of the package, this being for purposes of illustration. In actual manufacture the two halves of the container may be only around 0.025" or 0.030" in thickness, more or less, depending on the particular plastic material used, and the minute holes may be only, e. g., 0.02" in diameter. They are, however, of sufficient number and with a sufficient distribution over the area of the package, e. g. spaced ½" apart, more or less, to permit escape of gases and to effect controlled breathing of the orange, while at the same time preventing or minimizing and controlling the entrance and circulation of air therethrough and excessive loss of moisture from the orange.

When such a package is shipped through the mails the recipient will receive the orange in an attractive transparent package which protects it during shipment but which permits the orange to be readily visible in the package. By removing the adhesive tape, the two halves of the package can be separated and the orange removed therefrom.

While I have illustrated a particular method of securing the two halves of the generally hemispherical container together, by overlapping, and with the use of a transparent adhesive tape, the invention, in its broader aspects, includes other means of holding the two halves of the container together, such as those referred to above.

While the invention has been described particularly in connection with the use of the container for shipping oranges, it will be understood that other fruits, etc. can be similarly shipped, nor do I intend to limit my invention to containers made of plastic materials, although these materials now appear most advantageous. The containers may be made from laminated paper or cardboard and provided with minute holes of the proper size and number; or they might be made of coated and reinforced cloth or the like provided with the required holes. These and other variations and modifications can be made in the invention without departing from the scope thereof.

I claim:

1. A commercial package comprising a fruit and a container enclosing the same comprising two generally hemispherical, pre-formed, form-retaining halves meeting at their edge portions and secured together, said halves being made of strong, flexible, transparent, shock-resisting plastic material capable of withstanding handling and shipment by mail, and each having a number of holes distributed over the area thereof to permit the venting of gases and moisture and the breathing of the fruit, the inside of said enclosing container in contour and size being substantially the shape as the contour and size of the fruit which it encloses.

2. A commercial package comprising a fruit and a container enclosing the same comprising two generally hemispherical, pre-formed, form-retaining halves overlapping at their edge portions and secured together, said halves being made of strong, flexible, transparent, shock-resisting plastic material capable of withstanding handling and shipment by mail, and each having a number of holes distributed over the area thereof to permit the venting of gases and moisture and the breathing of the fruit, the inside of said enclosing container in contour and size being substantially the shape as the contour and size of the fruit which it encloses, at least one of the halves of the enclosing container having a flat outer surface portion.

3. A commercial package comprising a citrus fruit, a container enclosing the same comprising two generally hemispherical, pre-formed, form-retaining halves overlapping at their edge portions, each of said halves having a smooth interior surface and being made of strong, flexible, transparent, shock-resisting plastic material capable of withstanding handling and shipment by mail and each having a number of holes distributed over the area thereof, the inside of said enclosing container in contour and size being substantially the same as the contour and size of the enclosed citrus fruit, and a transparent adhesive tape securing said halves of the container together at their overlapping edges, said adhesive tape being of sufficient width to carry the address of a person and a Government postage stamp, at least one of said halves of the container having a flat outer surface substantially parallel to the plane of the open side thereof.

FRANK B. ARNOLD.

REFERENCES CITED

The following references are of record in the file of this patent:

UNITED STATES PATENTS

| Number | Name | Date |
|---|---|---|
| 514,159 | Nelson | Feb. 6, 1894 |
| 1,313,582 | Cowan | Aug. 19, 1919 |
| 1,685,392 | G. W. Beadle | Sept. 25, 1928 |
| 1,774,866 | H. I. Beadle | Sept. 2, 1930 |

FOREIGN PATENTS

| Number | Country | Date |
|---|---|---|
| 326,549 | Great Britain | Mar. 17, 1930 |